(12) United States Patent
Castañeda

(10) Patent No.: US 10,962,809 B1
(45) Date of Patent: Mar. 30, 2021

(54) EYEWEAR DEVICE WITH FINGER ACTIVATED TOUCH SENSOR

(71) Applicant: Julio Cesar Castañeda, Redondo Beach, CA (US)

(72) Inventor: Julio Cesar Castañeda, Redondo Beach, CA (US)

(73) Assignee: Snap Inc., Santa Monica, CA (US)

( * ) Notice: Subject to any disclaimer, the term of this patent is extended or adjusted under 35 U.S.C. 154(b) by 228 days.

(21) Appl. No.: 16/241,063

(22) Filed: Jan. 7, 2019

Related U.S. Application Data

(60) Provisional application No. 62/615,664, filed on Jan. 10, 2018.

(51) Int. Cl.
| | |
|---|---|
| *G02C 1/00* | (2006.01) |
| *G02C 11/00* | (2006.01) |
| *G06F 3/044* | (2006.01) |
| *G02B 27/01* | (2006.01) |
| *G06F 3/045* | (2006.01) |

(52) U.S. Cl.
CPC .......... *G02C 11/10* (2013.01); *G02B 27/0176* (2013.01); *G06F 3/044* (2013.01); *G06F 3/045* (2013.01); *G02B 2027/0178* (2013.01); *G06F 2203/04104* (2013.01)

(58) Field of Classification Search
CPC .. G09G 5/10; G09G 2354/00; G09G 2320/06; G09G 2320/0626; G02C 11/00; G02C 11/10; G02C 1/00; G02B 2027/017; G02B 2027/0178; G02B 27/00; G02B 27/01; G02B 27/0101; G02B 27/017; G02B 27/0172; G02B 27/0176; G06F 3/011; G06F 3/0346; G06F 3/041; G06F 3/0412; G06F 3/0414; G06F 3/044; G06F 3/045; G06F 3/048; G06F 3/0484; G06F 3/04845; G06F 3/0485; G06F 3/0486; G06F 3/0487; G06F 3/0488; G06F 3/04883; G06F 3/3231; G06F 2203/01; G06F 2203/041; G06F 2203/04101; G06F 2203/04104; G06F 2203/04108; G06F 2203/04806
USPC ...................... 351/41, 158; 345/7–9; 349/11
See application file for complete search history.

(56) References Cited

U.S. PATENT DOCUMENTS

| 9,678,338 B1 | 6/2017 | Bamberger et al. | |
|---|---|---|---|
| 2015/0103021 A1* | 4/2015 | Lim | ........................ G06F 1/163 345/173 |

* cited by examiner

*Primary Examiner* — Hung X Dang
(74) *Attorney, Agent, or Firm* — Culhane Meadows PLLC; Stephen J. Weed

(57) ABSTRACT

An eyewear device includes a frame, a temple connected to a lateral side of the frame, a processor, and an image display. The eyewear device further includes a touch sensor. The touch sensor includes an input surface and a sensor array that is coupled to the input surface to receive at least one finger contact inputted from a user. The sensor array can be a capacitive array or a resistive array. A sensing circuit is configured to measure voltage to track the at least one finger contact on the input surface. The processor of the eyewear device can identify a finger gesture based on at least one detected touch event, and adjust an image presented on the image display based on the identified finger gesture.

20 Claims, 11 Drawing Sheets

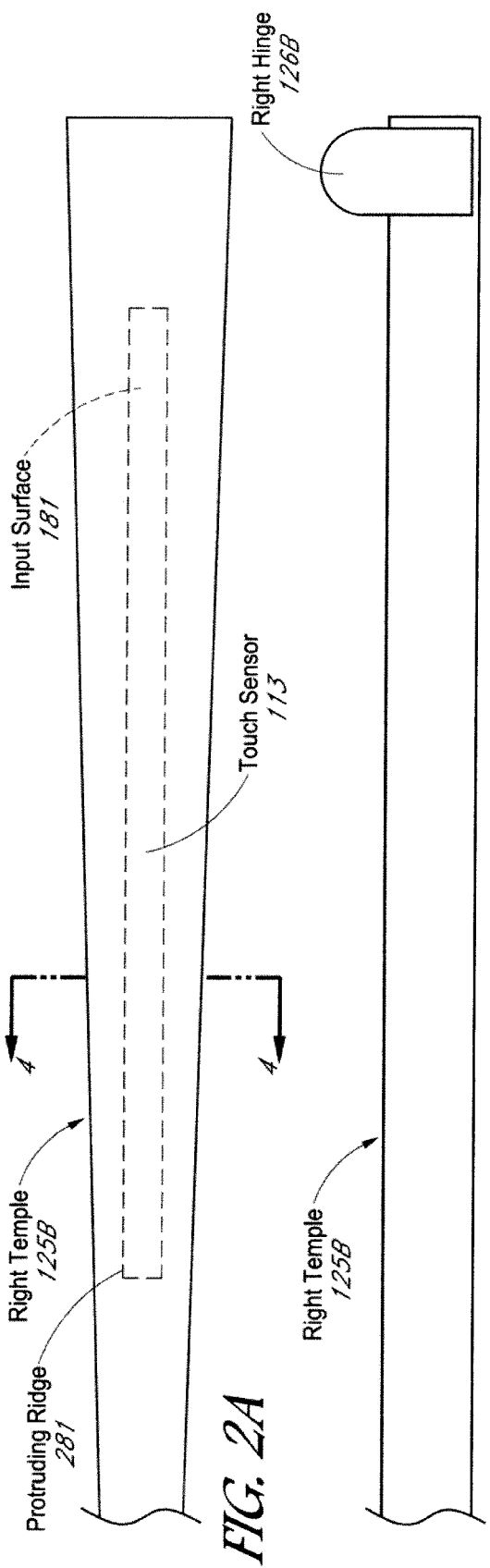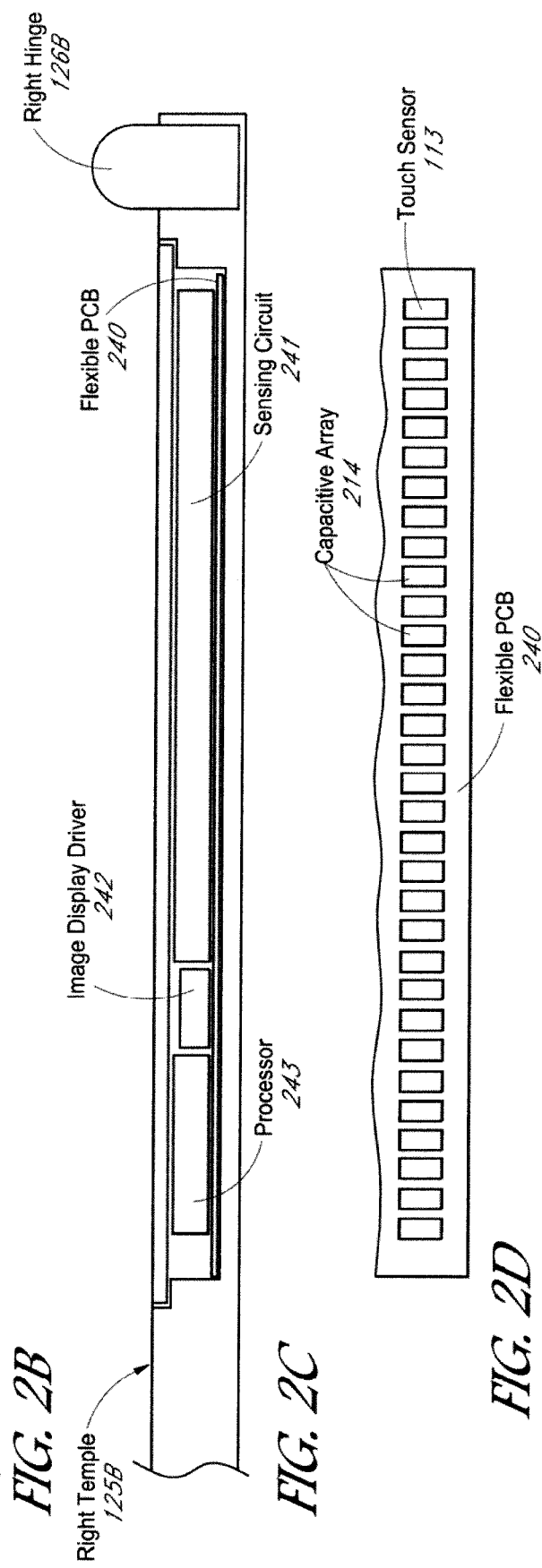

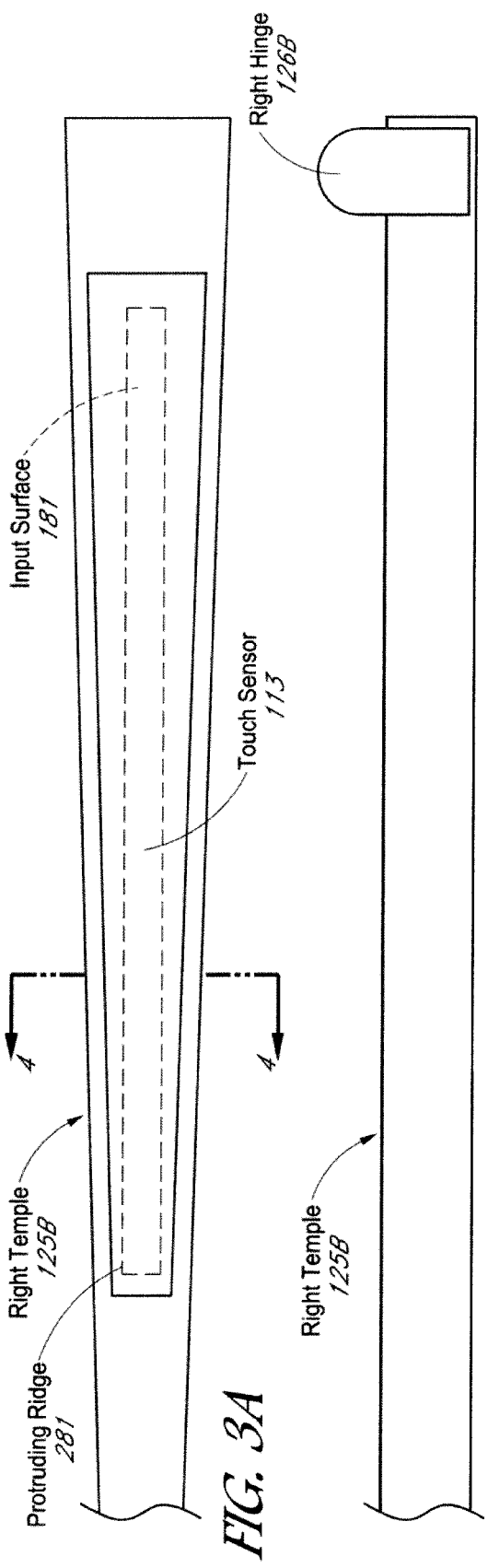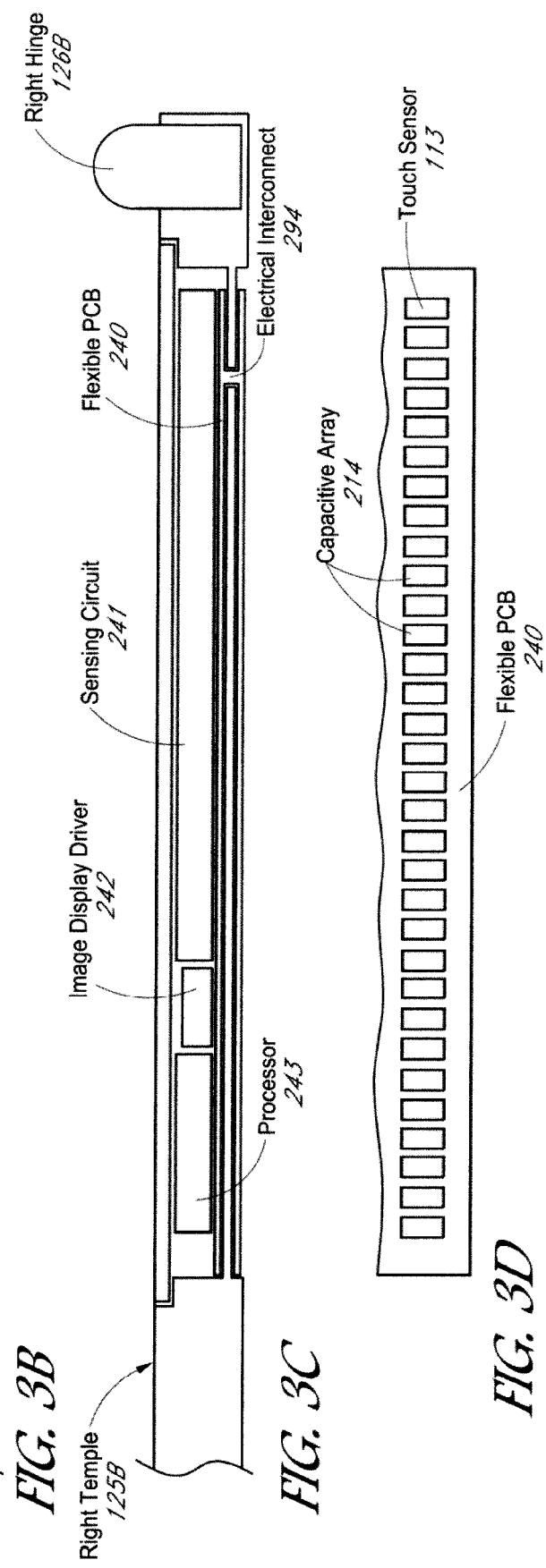

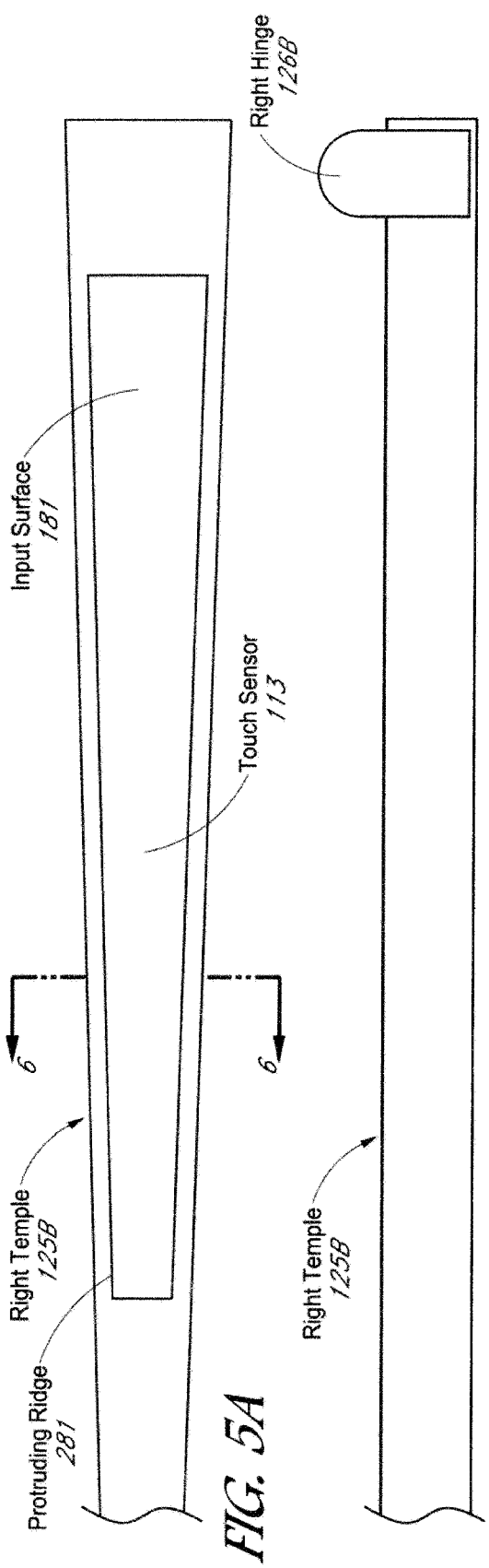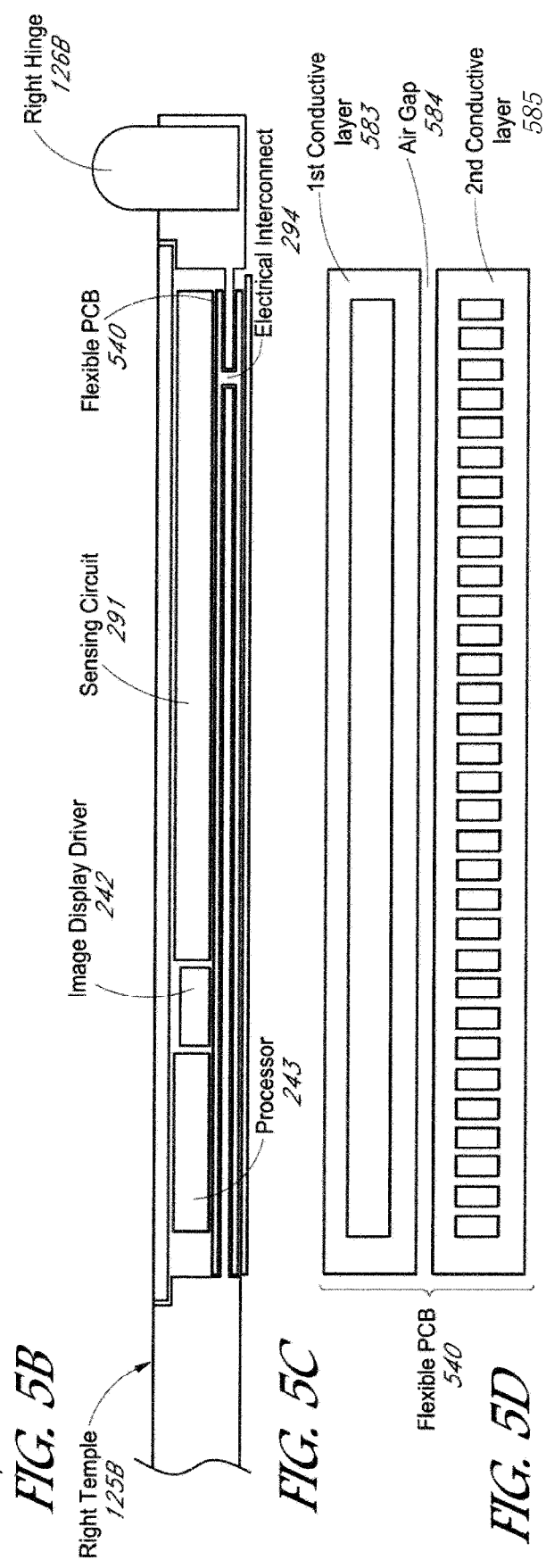

EYEWEAR DEVICE WITH FINGER ACTIVATED TOUCH SENSOR

CROSS-REFERENCE TO RELATED APPLICATIONS

This application is entitled to priority under 35 U.S.C. § 119(e) to U.S. Provisional Patent Application No. 62/615,664, filed Jan. 10, 2018, which application is hereby incorporated herein by reference in its entirety.

TECHNICAL FIELD

The present subject matter relates to eyewear devices, e.g., smart glasses, and, more particularly, to eyewear devices with touch sensors (e.g., slide controllers) for receiving user gestures.

BACKGROUND

Portable eyewear devices, such as smartglasses, headwear, and headgear available today integrate lenses, cameras, and wireless network transceiver devices. Unfortunately, size limitations and the form factor of an eyewear device can make a user interface difficult to incorporate into the eyewear device. The available area for placement of various control buttons on an eyewear device, e.g., to operate a camera, is limited. Due to the small form factor of the eyewear device, manipulation and interacting with, for example, displayed content on an image display is difficult.

BRIEF DESCRIPTION OF THE DRAWINGS

The drawing figures depict one or more implementations, by way of example only, not by way of limitations. In the figures, like reference numerals refer to the same or similar elements.

FIG. 2A shows a side view of a temple of the eyewear device of FIGS. 1A-C depicting a capacitive type touch sensor example.

FIG. 2B illustrates an external side view of a portion of the temple of the eyewear device of FIGS. 1A-C and FIG. 2A.

FIG. 2C illustrates an internal side view of the components of the portion of temple of the eyewear device of FIGS. 1A-C and FIG. 2B with a cross-sectional view of a circuit board with the touch sensor, a sensing circuit, an image display driver, and a processor.

FIG. 2D depicts a capacitive array pattern formed on the circuit board of FIG. 2C to receive finger contacts.

FIG. 3A shows an external side view of a temple of the eyewear device of FIG. 1 depicting another capacitive type touch sensor.

FIG. 3B illustrates an external side view of a portion of the temple of the eyewear device of FIGS. 1A-C and FIG. 3A.

FIG. 3C illustrates an internal side view of the components of the portion of temple of the eyewear device of FIGS. 1A-C and FIG. 3B with a cross-sectional view of a circuit board with the touch sensor, a sensing circuit, an image display driver, and a processor.

FIG. 3D depicts the capacitive array pattern formed on the circuit board of FIG. 3C to receive finger contacts.

FIG. 5A shows an external side view of a temple of the eyewear device of FIGS. 1A-C depicting a resistive type touch sensor example.

FIG. 5B illustrates an external side view of a portion of the temple of the eyewear device of FIGS. 1A-C and FIG. 5A.

FIG. 5C illustrates an internal side view of the components of the portion of temple of the eyewear device of FIGS. 1A-C and FIG. 5B with a cross-sectional view of a circuit board with the touch sensor, a sensing circuit, an image display driver, and a processor.

FIG. 5D depicts a resistive array pattern formed on the circuit board of FIG. 5C to receive finger contacts.

DETAILED DESCRIPTION

Figure 1A:
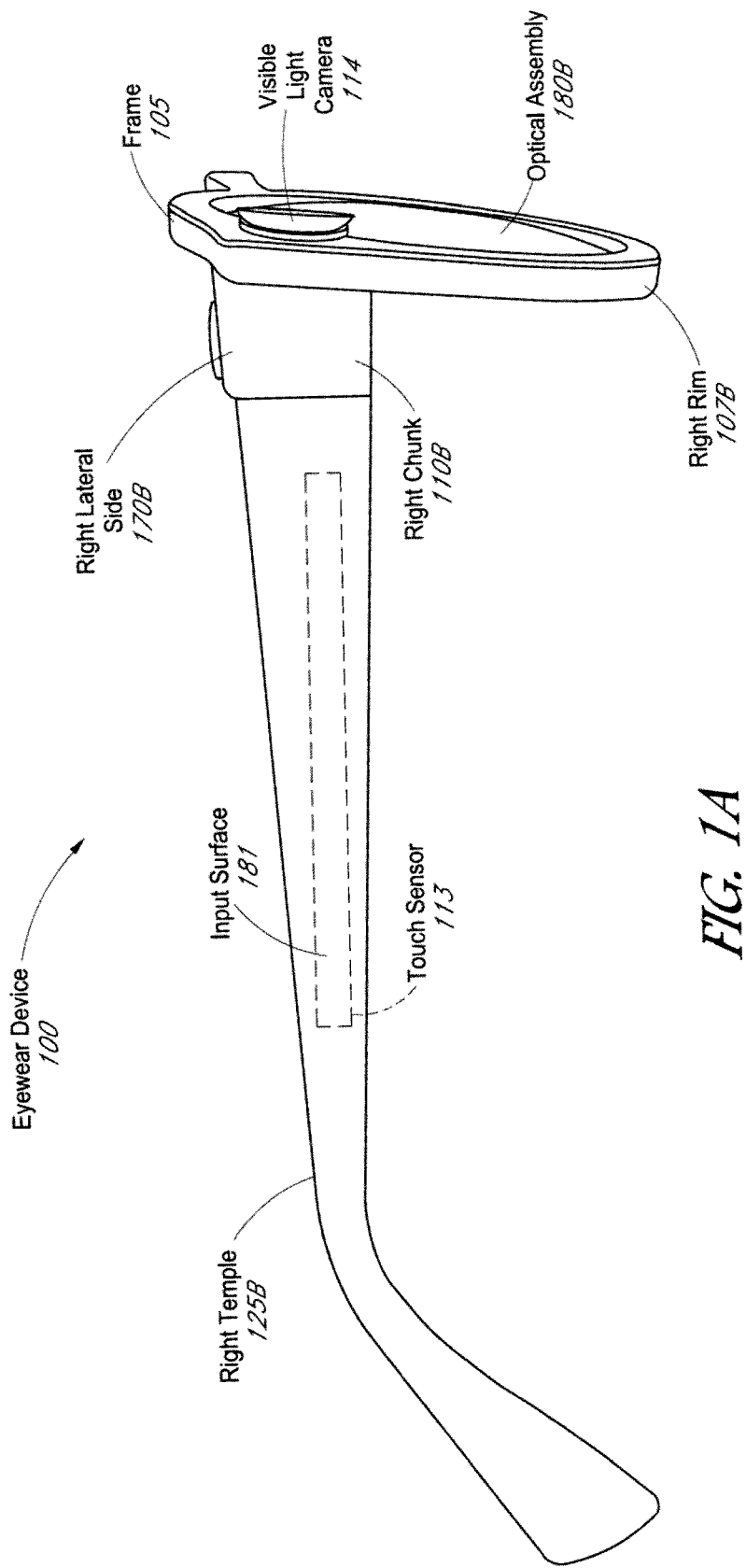
FIG. 1A is a side view of an example hardware configuration of an eyewear device, which includes a touch sensor on a temple, for use in identifying a finger gesture for adjusting an image presented on an image display of the eyewear device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a touch sensor such as shown in any of the drawings, are given by way of example only, for illustration and discussion purposes. In operation for a particular touch sensing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any touch sensor or component of a touch sensor constructed as otherwise described herein.

In an example, an eyewear device includes a frame, a temple connected to a lateral side of the frame, an image display, a processor, and a touch sensor. The touch sensor includes an input surface and a sensor array that is coupled to the input surface to receive at least one finger contact inputted from a user. The sensor array can be a capacitive array or a resistive array. The eyewear device further includes a sensing circuit integrated into or connected to the touch sensor and connected to the processor. The sensing circuit is configured to measure voltage to track the at least one finger contact on the input surface. The eyewear device further includes a memory accessible to the processor.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1B:
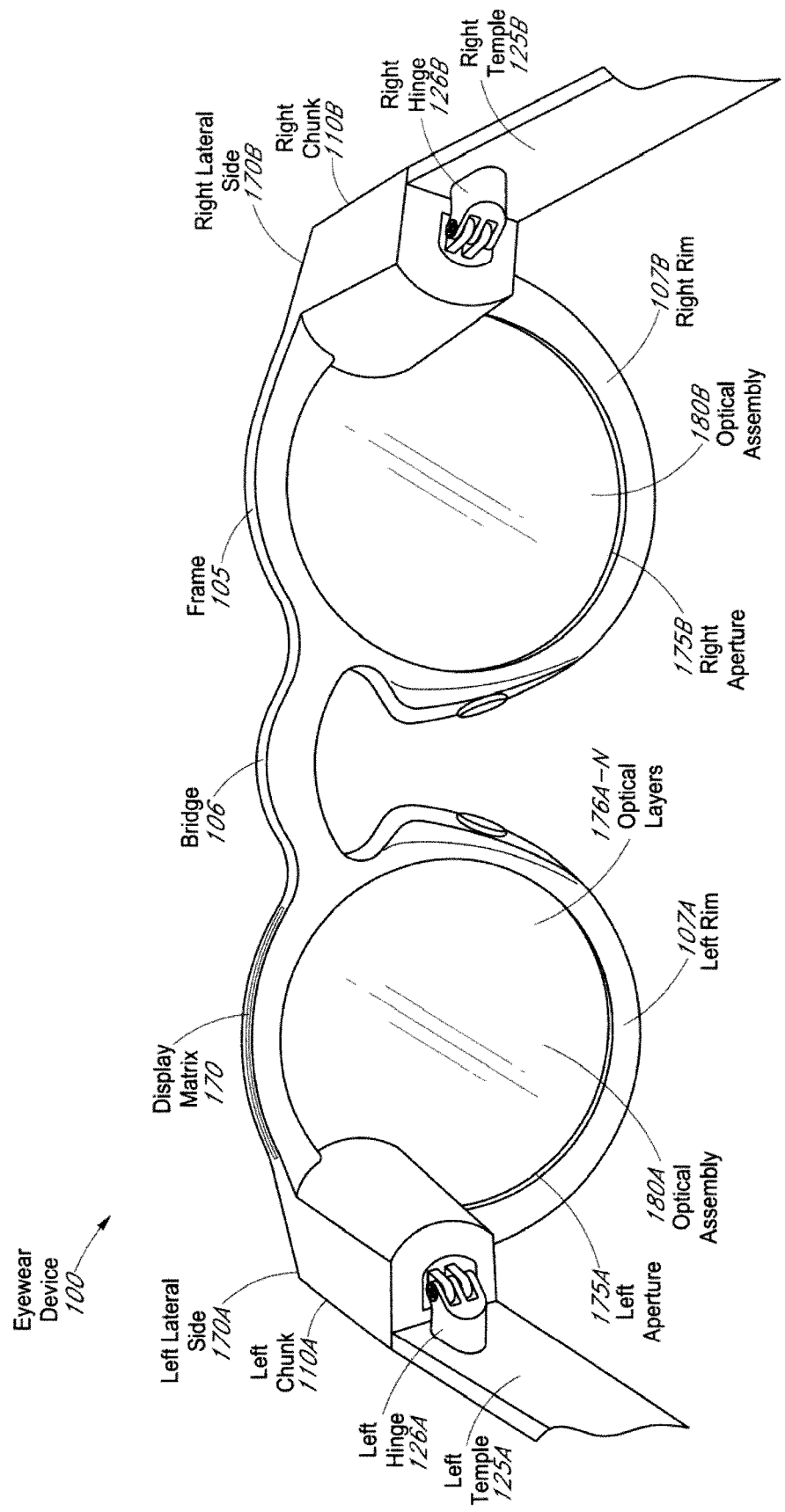
FIGS. 1B-C are rear views of example hardware configurations of the eyewear device of FIG. 1A, including two different types of image displays.
Figure 1C:
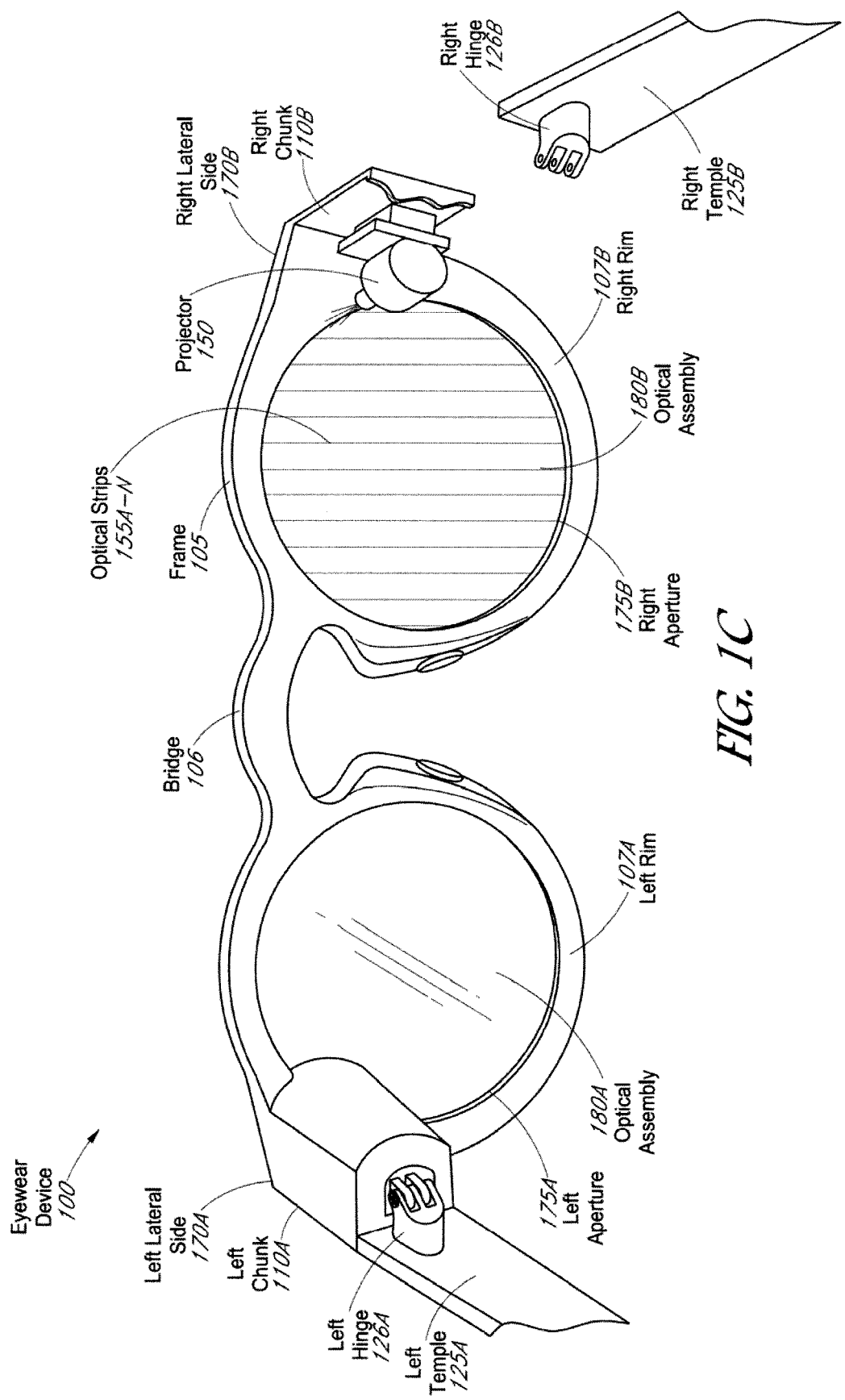

FIG. 1A is a side view of an example hardware configuration of an eyewear device 100, which includes a touch sensor 113 on a temple 125B. The touch sensor 113 identifies finger gestures for adjusting an image presented on an image display of an optical assembly 180B of the eyewear device 100. The touch gestures are inputs to the human-machine interface of the eyewear device 100 to perform specific actions in applications executing on the eyewear device 100 or to navigate through displayed images in an intuitive manner which enhances and simplifies the user experience. As shown in FIGS. 1A-C, the eyewear device 100 is in a form configured for wearing by a user, which are eyeglasses in the example of FIGS. 1A-C. The eyewear device 100 can take other forms and may incorporate other types of frameworks, for example, a headgear, a headset, or a helmet. It should be understood that in some examples, the touch sensor 113 may receive input in a manner other than finger contact, for example, a stylus or other mechanical input device.

In the eyeglasses example, eyewear device 100 includes a frame 105 including a left rim 107A connected to a right rim 107B via a bridge 106 adapted for a nose of the user. The left and right rims 107A-B include respective apertures 175A-B, which hold a respective optical assembly 180A-B. Optical assembly 180A-B can include various optical layers 176A-N and an image display device. The left and right temples 125A-B are connected to respective lateral sides of the frame 105, for example, via respective left and right chunks 110A-B. A substrate or materials forming the temple 125A-B can include plastic, acetate, metal, or a combination thereof. The chunks 110A-B can be integrated into or connected to the frame 105 on the lateral side.

Eyewear device 100 includes touch sensor 113 on the frame 105, the temple 125A-B, or the chunk 110A-B. The touch sensor 113 includes an input surface 181 and a capacitive array or a resistive array that is coupled to the input surface 181 to receive at least one finger contact input by a user. Although not shown, in FIGS. 1A-B, eyewear device 100 includes a processor, a memory accessible to the processor, and a sensing circuit. The sensing circuit is integrated into or connected to the touch sensor 113 and is connected to the processor. The sensing circuit is configured to measure voltage to track the at least one finger contact on the input surface 181.

The eyewear device 100 includes programming in the memory. Execution of the programming by the processor configures the eyewear device 100 to perform functions, including functions to receive on the input surface 181 of the touch sensor 113 the at least one finger contact input by the user. The execution of the programming by the processor further configures the eyewear device 100 to track, via the sensing circuit, the at least one finger contact on the input surface 181. The execution of the programming by the processor further configures the eyewear device 100 to detect at least one touch event on the input surface 181 of the touch sensor 113 based on the at least one finger contact on the input surface 181.

A touch event represents when the state of contacts with the touch sensor 113 changes. The touch event can describe one or more points of contact with the touch sensor 113 and can include detecting movement, and the addition or removal of contact points. The touch event can be described by a position on the touch sensor 113, size, shape, amount of pressure, and time. The execution of the programming by the processor further configures the eyewear device 100 to identify a finger gesture based on the at least one detected touch event.

The execution of the programming by the processor further configures the eyewear device 100 to adjust an image presented on the image display of the optical assembly 180A-B based on the identified finger gesture. For example, when the at least one detected touch event is a single tap on the input surface 181 of the touch sensor 113, the identified finger gesture is selection or pressing of a graphical user interface element in the image presented on the image display of the optical assembly 180A-B. Hence, the adjustment to the image presented on the image display of the optical assembly 180A-B based on the identified finger gesture is a primary action which selects or submits the graphical user interface element on the image display of the optical assembly 180A-B for further display or execution. This is just one example of a supported finger gesture, and it should be understood that several finger gesture types are supported by the eyewear device 100 which can include single or multiple finger contacts. Examples of multiple finger contact detected touch events and identified finger gestures are provided in FIGS. 7-10. Moreover, in some examples, the touch sensor 113 may control other output components, such as a speakers of the eyewear device 100, with the touch sensor 113 controlling volume, for example.

Eyewear device 100 may include wireless network transceivers, for example cellular or local area network transceivers (e.g., WiFi or Bluetooth™), and run sophisticated applications. Some of the applications may include a web browser to navigate the Internet, an application to place phone calls, video or image codecs to watch videos or interact with pictures, codecs to listen to music, a turn-by-turn navigation application (e.g., to enter in a destination address and view maps), an augmented reality application, an email application (e.g., to read and compose emails). Gestures inputted on the touch sensor 113 can be used to manipulate and interact with the displayed content on the image display and control the applications.

While touch screens exist for mobile devices, such as tablets and smartphones, utilization of a touch screen in the lens of an eyewear device can interfere with the line of sight of the user of the eyewear device 100 and hinder the user's view. For example, finger touches can smudge the optical assembly 180-B (e.g., optical layers, image display, and lens) and cloud or obstruct the user's vision. To avoid creating blurriness and poor clarity when the user's eyes look through the transparent portion of the optical assembly 180A-B, the touch sensor 113 is located on the right temple 125B.

Touch sensor 113 can include a sensor array, such as a capacitive or resistive array, for example, horizontal strips or vertical and horizontal grids to provide the user with variable slide functionality, or combinations thereof. In one example, the capacitive array or the resistive array of the touch sensor 113 is a grid that forms a two-dimensional rectangular coordinate system to track X and Y axes location coordinates. In another example, the capacitive array or the resistive array of the touch sensor 113 is linear and forms a one-dimensional linear coordinate system to track an X axis location coordinate. Alternatively or additionally, the touch sensor 113 may be an optical type sensor that includes an image sensor that captures images and is coupled to an image processor for digital processing along with a timestamp in which the image is captured. The timestamp can be added by a coupled sensing circuit 241 which controls operation of the touch sensor 113 and takes measurements from the touch sensor 113. The sensing circuit 241 uses algorithms to detect patterns of the finger contact on the input surface 181, such as ridges of the fingers, from the digitized images that are generated by the image processor. Light and dark areas of the captured images are then analyzed to track the finger contact and detect a touch event, which can be further based on a time that each image is captured.

Touch sensor 113 can enable several functions, for example, touching anywhere on the touch sensor 113 may highlight an item on the screen of the image display of the optical assembly 180A-B. Double tapping on the touch sensor 113 may select an item. Sliding (e.g., or swiping) a finger from front to back may slide or scroll in one direction, for example, to move to a previous video, image, page, or slide. Sliding the finger from back to front may slide or scroll in the opposite direction, for example, to move to a previous video, image, page, or slide. Pinching with two fingers may provide a zoom-in function to zoom in on content of a displayed image. Unpinching with two fingers provides a zoom-out function to zoom out of content of a displayed image. The touch sensor 113 can be provided on both the left and right temples 125A-B to increase available functionality or on other components of the eyewear device 113, and in some examples, two, three, four, or more touch sensors 113 can be incorporated into the eyewear device 100 in different locations.

The type of touch sensor 113 depends on the intended application. For example, a capacitive type touch sensor 113 has limited functionality when the user wears gloves. Additionally, rain can trip false registers on the capacitive type touch sensor 113. A resistive type touch sensor 113 on the other hand, requires more applied force, which may not be optimal to the user wearing the eyewear device 100 on their head. Both capacitive and resistive type technologies can be leveraged by having multiple touch sensors 113 in the eyewear device 100 given their limitations.

In the example of FIG. 1A, the eyewear device includes at least one visible light camera 114 that is sensitive to the visible light range wavelength. As shown in the example, the visible light camera 114 has a frontward facing field of view. Examples of such a visible light camera 114 include a high resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light camera 114 is captured along with geolocation data, digitized by an image processor, stored in a memory, and displayed on the image display device of optical assembly 180A-B. In some examples, the touch sensor 113 is responsive to provide image or video capture via the visible light camera 114, for example, in response to any of the identified finger gestures disclosed herein.

FIGS. 1B-C are rear views of example hardware configurations of the eyewear device 100 of FIG. 1A, including two different types of image displays. In one example, the image display of optical assembly 180A-B includes an integrated image display. An example of such an integrated image display is disclosed in FIG. 5 of U.S. Pat. No. 9,678,338, filed Jun. 19, 2015, titled "Systems and Methods for Reducing Boot Time and Power Consumption in Wearable Display Systems," which is incorporated by reference herein. As shown in FIG. 1B, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex so as to direct the light towards the center of the eye. The prism can optionally be sized and shaped so as to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 1C. An example of a projection image display is disclosed in FIG. 6 of U.S. Pat. No. 9,678,338, filed Jun. 19, 2015, titled "Systems and Methods for Reducing Boot Time and Power Consumption in Wearable Display Systems," which is incorporated by reference herein. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, it is either redirected towards the user's eye, or it passes to the next optical strip. Specific photons or beams of light may be controlled by a combination of modulation of laser projector 150, and modulation of optical strips 155A-N. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIG. 1B, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105.

FIG. 2A shows a side view of a temple 125B of the eyewear device 100 of FIG. 1A depicting a capacitive type touch sensor 113 example. As shown, the right temple 125B includes the touch sensor 113 and the touch sensor 113 has an input surface 181. A protruding ridge 281 surrounds the input surface 181 of the touch sensor 113 to indicate to the user an outside boundary of the input surface 181 of the touch sensor 113. The protruding ridge 281 orients the user by indicating to the user that their finger is on top of the touch sensor 113 and is in the correct position to manipulate the touch sensor 113.

FIG. 2B illustrates an external side view of a portion of the temple of the eyewear device 100 of FIGS. 1A-C and FIG. 2A. In the capacitive type touch sensor 113 example of FIGS. 2A-D, plastic or acetate form the right temple 125B. The right temple 125B is connected to the right chunk 110B via the right hinge 126B.

FIG. 2C illustrates an internal side view of the components of the portion of temple of the eyewear device 100 of FIGS. 1A-C and FIG. 2B with a cross-sectional view of a circuit board 240 with the touch sensor 113, a sensing circuit 241, an image display driver 242, and a processor 243. Although the circuit board 240 is a flexible printed circuit board (PCB), it should be understood that the circuit board 240 can be rigid in some examples. In some examples, the frame 105 or the chunk 110A-B can include the circuit board 140 that includes the touch sensor 113. In one example, sensing circuit 241 includes a dedicated microprocessor integrated circuit (IC) customized for processing sensor data from the touch sensor 113, along with volatile memory used by the microprocessor to operate. In some examples, the sensing circuit 241 and processor 243 may not be separate components, for example, functions and circuitry implemented in the sensing circuit 241 can be incorporated or integrated into the processor 243 itself.

Image display driver 242 commands and controls the image display of the optical assembly 180A-B. Image display driver 242 may deliver image data directly to the image display of the optical assembly 180A-B for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The touch sensor 113 is disposed on the flexible printed circuit board 240. The touch sensor 113 includes a capacitive array that is coupled to the input surface 181 to receive at least one finger contact inputted from a user. The sensing circuit 241 is integrated into or connected to the touch sensor 113 and connected to the processor 243. The sensing circuit 241 is configured to measure voltage to track the at least one finger contact on the input surface 181.

FIG. 2D depicts a capacitive array pattern formed on the circuit board of FIG. 2C to receive finger contacts. The pattern of the capacitive array 214 of the touch sensor 113 includes patterned conductive traces formed of at least one metal, indium tin oxide, or a combination thereof on the flexible printed circuit board 240. In the example, the conductive traces are rectangular shaped copper pads.

FIG. 3A shows an external side view of a temple 125B of the eyewear device 100 of FIG. 1 depicting another capacitive type touch sensor 113. Similar to the example of FIGS. 2A-D, the right temple 125B includes the touch sensor 113 and the touch sensor 113 has a protruding ridge 281 that surrounds an input surface 181. FIG. 3B illustrates an external side view of a portion of the temple 125B of the eyewear device 100 of FIG. 1A and FIG. 3A. Metal may form the right temple 125B and a plastic external layer can cover the metal layer.

FIG. 3C illustrates an internal side view of the components of the portion of temple 125B of the eyewear device 100 of FIG. 1A and FIG. 3B with a cross-sectional view of a circuit board 240 with the touch sensor 113, a sensing circuit 241, an image display driver 242, and a processor 243. Similar to FIG. 2C, the touch sensor 113 is disposed on the flexible printed circuit board 240. Various electrical interconnect(s) 294 are formed to convey electrical signals from the input surface 181 to the flexible printed circuit board 240. FIG. 3D depicts a pattern of the capacitive array 214 formed on the flexible printed circuit board 240 of FIG. 3C to receive finger contacts similar to FIG. 2C.

Figures 4A, 4B:
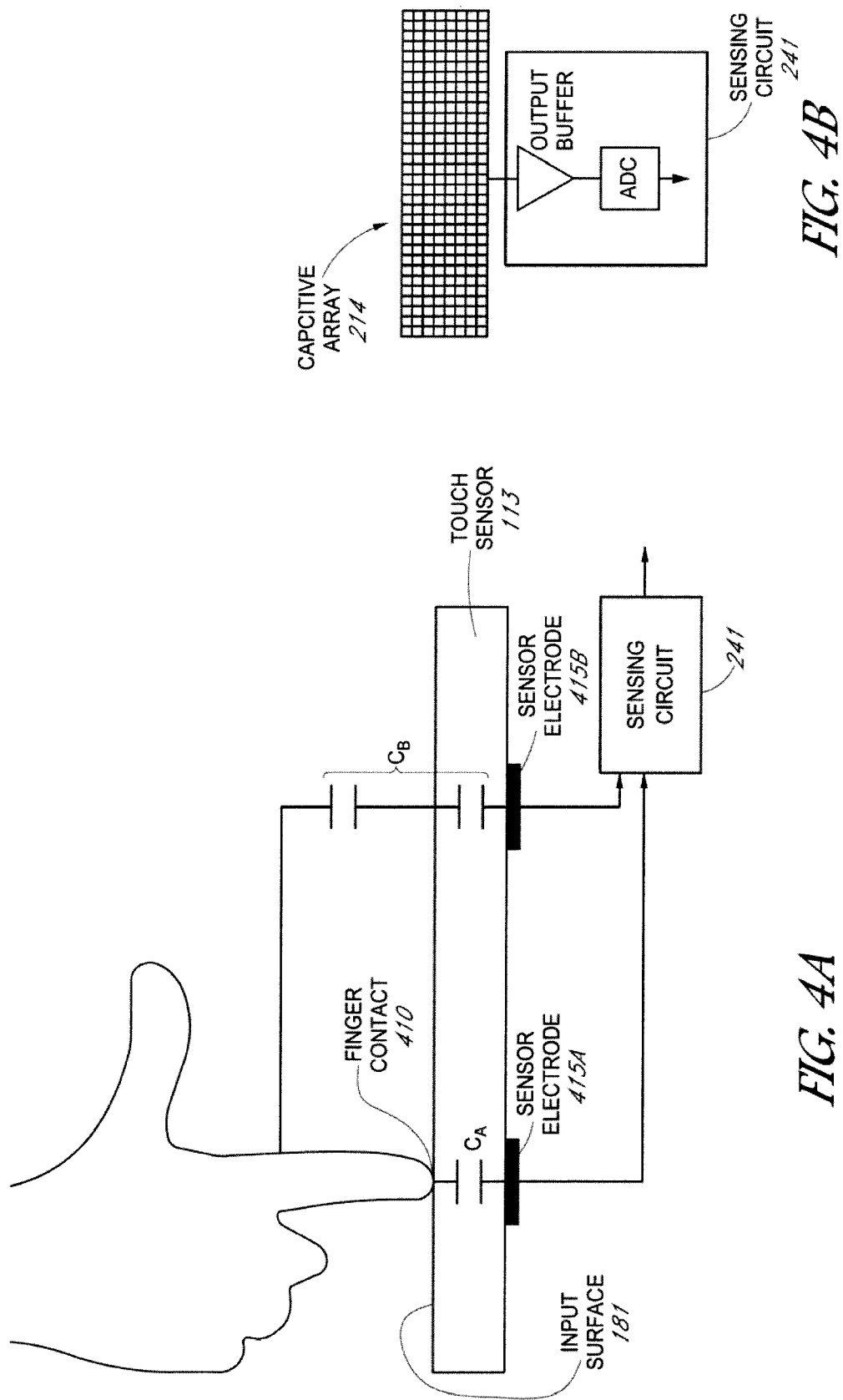
FIGS. 4A-B show operation and a circuit diagram of the capacitive type touch sensor of FIGS. 2A-D and 3A-D to receive finger contacts and the sensing circuit to track the finger contacts.

FIGS. 4A-B show operation and a circuit diagram of the capacitive type touch sensor 113 of FIGS. 2A-D and 3A-D to receive finger contacts and the sensing circuit 241 to track the finger contacts 410. The view of FIG. 4A is intended to give a cross-sectional view of two capacitors of the capacitive array 214 of the touch sensor 113 of FIGS. 2A-D and 3A-D, and the coupled sensing circuit 241. As shown, the touch sensor 113 includes the capacitive array 214 formed by capacitors, including capacitors $C_A$ and $C_B$. The capacitive array 214 includes multiple patterned conductive sensor electrodes 415A-B, and it should be understood that although only two sensor electrodes are shown, the number can be 20, 100, 1000, etc. or essentially any number depending on the application. In one example, the capacitive array 214 includes 100 sensor electrodes, in other examples, the 100 sensor electrodes are arranged in a 10×10 grid. The sensor electrodes 415A-B are connected to the flexible printed circuit board 240 and disposed below the input surface 181. At least one respective electrical interconnect connects the sensing circuit 241 to the sensor electrodes 415A-B. The sensing circuit 241 is configured to measure capacitance changes of each of the sensor electrodes 415A-B of the capacitive array 214. In the example, the sensor electrodes 415A-B are rectangular patterned conductive traces formed of at least one of metal, indium tin oxide, or a combination thereof.

Since the capacitors $C_A$ and $C_B$ of the capacitive array 214 store electrical charge, connecting them up to conductive plates on the input surface 181 allows the capacitors to track the details of finger contacts 410. Charge stored in the capacitor $C_A$ changes slightly (e.g., the charge becomes higher) when the finger is placed over the conductive plates of capacitor $C_A$, while an air gap will leave the charge at the capacitor $C_B$ relatively unchanged (e.g., the charge remains lower). As shown in FIG. 4B, the sensing circuit 241 can include an op-amp integrator circuit which can track these changes in capacitance of capacitive array 214, and the capacitance changes can then be recorded by an analog-to-digital converter (ADC) and stored in a memory along with timing data of when the capacitance change is sensed.

Hence, the sensing circuit 241 is further configured to determine a respective location coordinate and a respective input time of the at least one finger contact 410 on the input surface 181. Execution of the programming by the processor configures the eyewear device 100 to perform functions, including functions to track, via the sensing circuit 241, the respective location coordinate and the respective input time of the at least one finger contact on the input surface 181. The function to detect the at least one touch event on the input surface 181 of the touch sensor 113 is based on the at least one respective location coordinate and the respective input time of the at least one finger contact 410.

FIG. 5A shows an external side view of a temple 125B of the eyewear device of FIGS. 1A-C depicting a resistive type touch sensor 114 on the temple 125B. Similar to the example of FIGS. 2A-D, the right temple 125B includes the touch sensor 113 and the touch sensor 113 has an input surface 181 surrounded by a protruding ridge 281. In this example, however, the touch sensor 113 includes a resistive array 514. FIG. 5B illustrates an external side view of a portion of the temple of the eyewear device 100 of FIG. 5A. Plastic or metal may form the right temple 125B.

FIG. 5C illustrates an internal side view of the components of the portion of temple of the eyewear device of FIGS. 1A-C and FIG. 5A with a cross-sectional view of a circuit board 540 with the touch sensor 113, a sensing circuit 241, an image display driver 242, and a processor 243. Similar to FIG. 2C, the touch sensor 113 is disposed on the flexible printed circuit board 540. Various electrical interconnect(s) 294 are formed to convey electrical signals from the input surface 181 to the flexible printed circuit board 540. FIG. 5D depicts a pattern of the resistive array 514 formed on the circuit board 540 of FIG. 5C to receive finger contacts similar to FIG. 2C. The flexible printed circuit board 540 is an air gapped dual layer flexible printed circuit board with a resistive pattern thereon.

As shown, the resistive array 514 includes two conductive layers, including a first conductive layer 583 (e.g., ground) and a second conductive layer 585 (e.g., signal). An air gap 584 between the two conductive layers 583 and 585 separates the first and second conductive layers. The first and second conductive layers 583 and 585 of the resistive array 514 can include rectangular patterned conductive traces formed of at least one metal, indium tin oxide, or a combination thereof. The two conductive layers 583 and 585 are connected to the flexible printed circuit board 540 and are disposed below the input surface 181 of the touch sensor 113.

When the outer first conductive layer 583 is pressed so that it makes contact with the inner second conductive layer 585, an electrical connection is made between the layers. In effect, this closes an electrical switch with the voltage measurements on the resistive array 514 taken by the sensing circuit 241 being directly correlated to where the touch sensor 113 is touched. A voltage gradient is applied either in a horizontal or a vertical direction of the resistive array 514 to acquire the X or Y location coordinates of the finger contact and repeats for the other direction, requiring two measurements. The sensing circuit 241 of the eyewear device 100 correlates the voltage measurement to the location coordinates of the finger contact.

Figure 6:
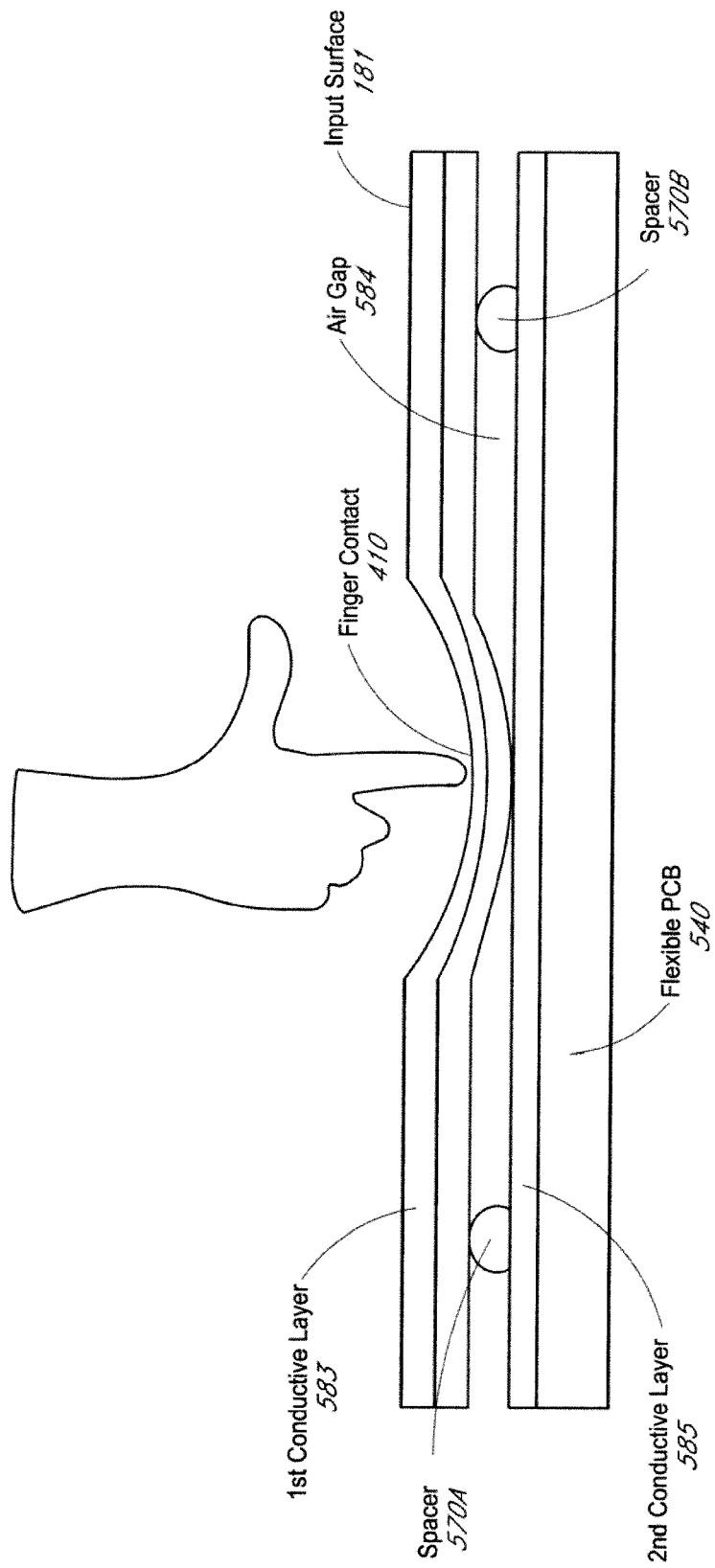
FIG. 6 shows operation and a circuit diagram of the resistive type touch sensor of FIGS. 5A-D to receive finger contacts.

FIG. 6 shows operation and a circuit diagram of the resistive type touch sensor of FIGS. 5A-D to receive finger contacts. The view of FIG. 6 is intended to give a cross-sectional view of a single resistor of the resistive array 514 of the touch sensor 113 of FIG. 5A, and the coupled sensing circuit (not shown). The first conductive layer 583 and the second conductive layer 585 are separated by insulating spacers 570A-B (shown as dots) to form an air gap 584 between the two conductive layers 583 and 585 which may be deposited or layered on respective substrates.

The sensing circuit 241 (not shown) is connected to the flexible printed circuit board 540 and connected to the two conductive layers 583 and 585 and configured to measure a voltage drop between the two conductive layers 583 and 585 in response to the at least one finger contact 410. In an example, the second conductive layer 585 is deposited on the flexible printed circuit board 540 and is separated from the first conductive layer 583 by the insulating spacers 570A-B. A flexible layer of protective insulation may be layered on the first conductive layer 585.

In one example, the sensing circuit 241 can track touch location coordinates on the resistive array 514 using four wires that are connected to the sensing circuit 241 and the conductive layers 583 and 585. Two wires are connected to the left and right sides of the second conductive layer 585, and two wires are connected to the top and bottom of the first conductive layer 583. A voltage gradient is applied across the first conductive layer 483 and when contact is made with the first conductive layer 583 the resulting circuit mimics a voltage divider. The voltage is then probed at the first conductive layer 583 to determine the x-coordinate of the touch location. This process is repeated for the y-axis by applying a potential across the first conductive layer 583 and measuring the voltage of the second conductive layer 585. In some examples, the sensing circuit 241 may employ a 5-wire method with a fifth wire behaving as a top layer voltage probe, in which the second conductive layer 585 is utilized for both X and Y-axis measurements.

FIGS. 7-10 illustrate several examples of multiple finger contact detected touch events and identified finger gestures. In each of the examples of FIGS. 7-10, the function to receive on the input surface 181 of the touch sensor 113 the at least one finger contact input by the user includes functions to: receive on the input surface 181 of the touch sensor 113 a first finger contact input by the user at a first input time; and receive on the input surface 181 of the touch sensor 113 a second finger contact 710B input by the user at a second input time which is within a predetermined time period of the first input time.

Further, in each of the examples of FIGS. 7-10, the function to detect the at least one touch event on the input surface 181 of the touch sensor 113 based on the at least one finger contact inputted from the user includes functions to: detect a first touch event on the input surface 181 of the touch sensor 113 based on the first finger contact inputted from the user at the first input time; and detect a second touch event on the input surface 181 of the touch sensor 113 based on the second finger contact inputted from the user at the second input time within the predetermined time period of the first input time. The function to identify the finger gesture is based on the first and second detected touch events, the first input time, the second input time, and the predetermined time period.

Figures 7A, 7B, 7C:
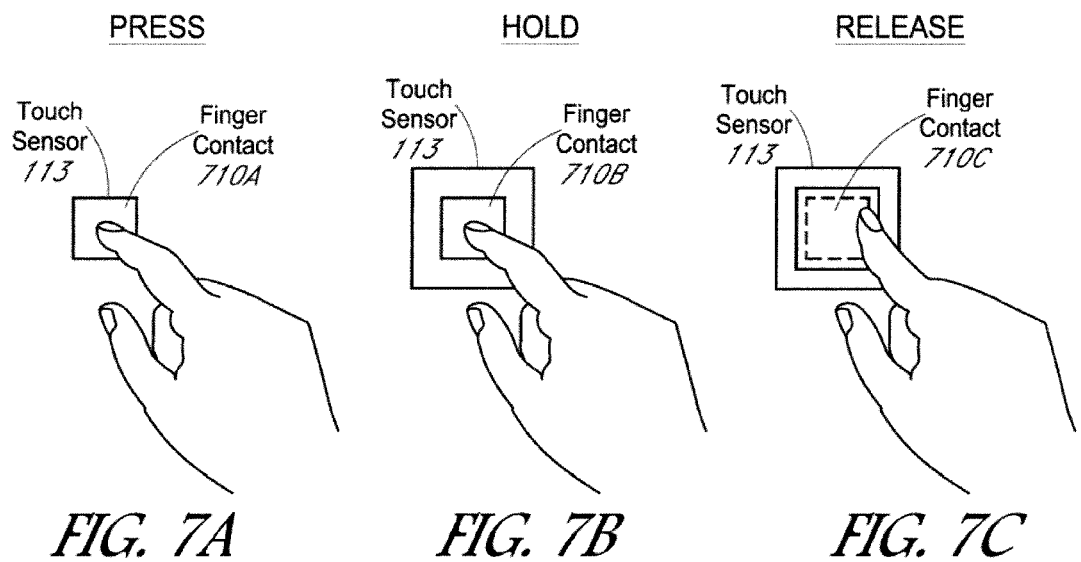
FIGS. 7A-C illustrate press and hold detected touch events on the input surface of the touch sensor.

FIGS. 7A-C illustrate press and hold detected touch events on the input surface 181 of the touch sensor 113. As shown, multiple finger contacts occur on the touch sensor 113, which include pressing (the first finger contact 710A), holding (the second finger contact 710B), and no finger contact 710C by releasing the touch sensor 113. Accordingly, the first and second detected touch events are a press and hold on the input surface 181 of the touch sensor 113. The identified finger gesture is a press and hold of a graphical user interface element in the image presented on the image display. The adjustment to the image presented on the image display based on the identified finger gesture is configured to allow a drag and drop (e.g., move) of the graphical user interface element on the image display or provide display options (e.g., a context menu associated with the graphical user interface element).

Figure 8:
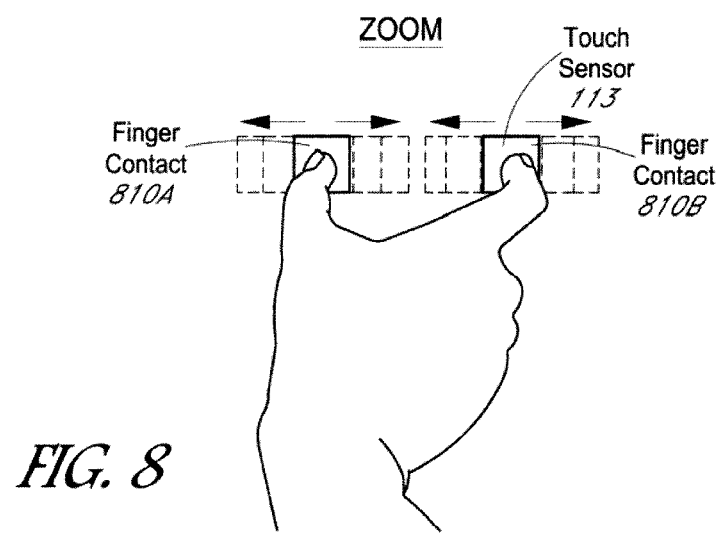
FIG. 8 illustrates finger pinching and unpinching detected touch events on the input surface of the touch sensor.

FIG. 8 illustrates finger pinching and unpinching detected touch events on the input surface 181 of the touch sensor 113. Multiple finger contacts occur on the touch sensor 113, in which two fingers (first finger contact 810A and second finger contact 810B) move apart from each other (finger unpinching) or move toward each other (finger pinching). In the finger pinching detected touch event example, the first and second detected touch events are finger pinching on the input surface 181 of the touch sensor 113. The identified finger gesture is a zoom in of the image presented on the image display. The adjustment to the image presented on the image display based on the identified finger gesture zooms in on the image presented on the image display.

In the finger unpinching detected touch event example, the first and second detected touch events are finger unpinching on the input surface of the touch sensor 113. The identified finger gesture is a zoom out of the image presented on the image display. The adjustment to the image presented on the image display based on the identified finger gesture zooms out of the image presented on the image display.

Figure 9:
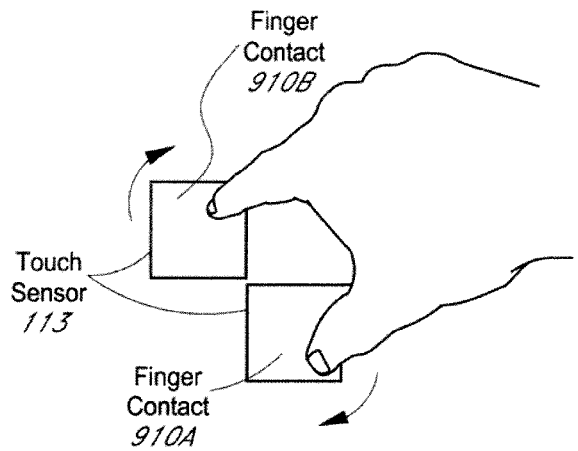
FIG. 9 illustrates finger rotation detected touch events on the input surface of the touch sensor.

FIG. 9 illustrates finger rotation detected touch events on the input surface 181 of the touch sensor 113. As shown, multiple finger contacts occur on the touch sensor 113, which include continuously rotating two fingers in a circle from two initial points, a first finger contact 910A and a second finger contact 910B, to two final points of contact for those two fingers. In some examples, only one finger may be rotated in a circle. The first and second detected touch events are finger rotation on the input surface 181 of the touch sensor 113. The identified finger gesture is a finger rotation of the image presented on the image display. The adjustment to the image presented on the display based on the identified finger gesture rotates the image presented on the image display, for example, to rotate a view. The rotation gesture is can occur when two fingers rotate around each other.

Figure 10:
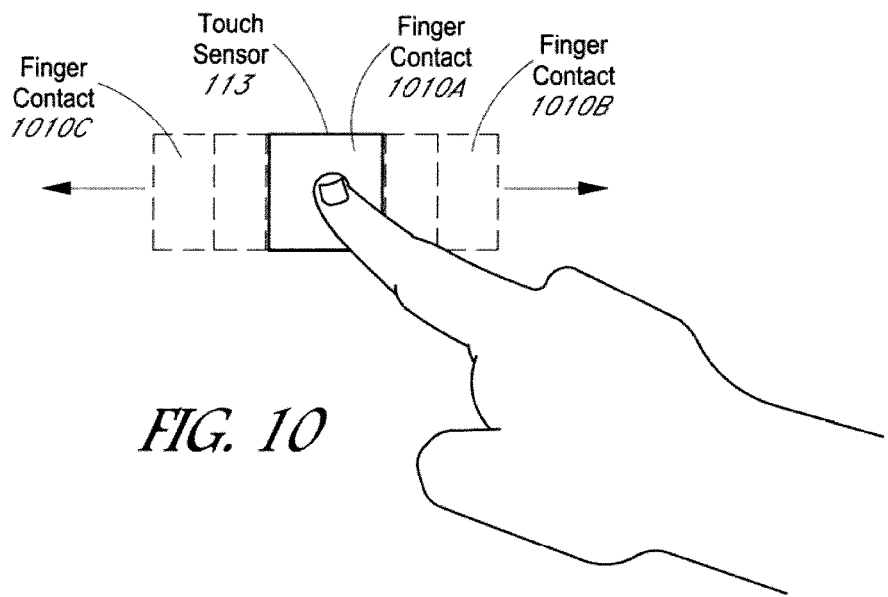
FIG. 10 illustrates finger swiping detected touch events on the input surface of the touch sensor.

FIG. 10 illustrates finger swiping detected touch events on the input surface 181 of the touch sensor 113. As shown, multiple finger contacts occur on the touch sensor 113, which include dragging one finger left or right from a point of initial finger contact 1010A to a final point of second finger contact 1010B or 1010C. The first and second detected touch events are finger swiping from front to back (1010A to 1010C) or back to front (1010A to 1010B) on the input surface 181 of the touch sensor 113. The identified finger gesture is a scroll of the image presented on the image display. The adjustment to the image presented on the image display based on the identified finger gesture scrolls the image presented on the image display. As shown, such a scroll or swipe gesture can occur when the user moves one or more fingers across the screen in a specific horizontal direction without significantly deviating from the main direction of travel, however, it should be understood that the direction of travel can be vertical as well, for example if the touch sensor 113 is a X and Y coordinate grid or a vertical strip.

Figure 11:
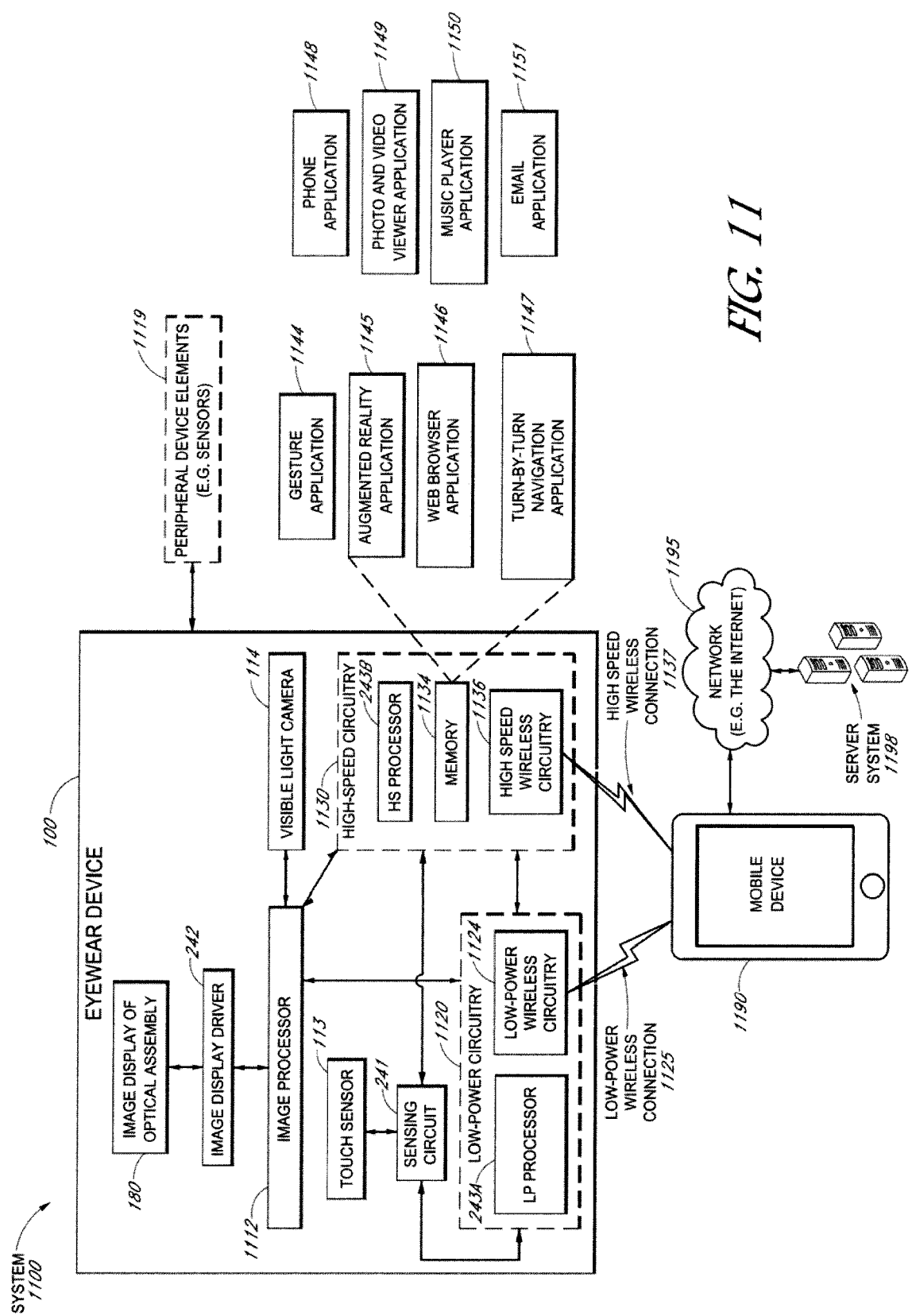
FIG. 11 is a high-level functional block diagram of an example finger activated touch sensor system including the eyewear device, a mobile device, and a server system connected via various networks.

FIG. 11 is a high-level functional block diagram of an example finger activated touch sensor system. The system 1100 includes eyewear device 100, mobile device 1190, and server system 1198. Mobile device 1190 may be a smartphone, tablet, laptop computer, access point, or any other such device capable of connecting with eyewear device 100 using both a low-power wireless connection 1125 and a high-speed wireless connection 1137. Mobile device 1190 is connected to server system 1198 and network 1195. The network 1195 may include any combination of wired and wireless connections.

Server system 1198 may be one or more computing devices as part of a service or network computing system, for example, that include a processor, a memory, and network communication interface to communicate over the network 1195 with the mobile device 1190 and eyewear device 100.

Low-power wireless circuitry 1124 and the high-speed wireless circuitry 1136 of the eyewear device 100 can include short range transceivers (Bluetooth™) and wireless wide, local, or wide area network transceivers (e.g., cellular or WiFi). Mobile device 1190, including the transceivers communicating via the low-power wireless connection 1125 and high-speed wireless connection 1137, may be implemented using details of the architecture of the eyewear device 100, as can other elements of network 1195.

Output components of the eyewear device 100 include visual components, such as the image display of the optical assembly 180 as described in FIGS. 1B-C (e.g., a display such as a liquid crystal display (LCD), a plasma display panel (PDP), a light emitting diode (LED) display, or a projector). The image display of the optical assembly 180 is driven by the image display driver 242. The output components of the eyewear device 100 further include acoustic components (e.g., speakers), haptic components (e.g., a vibratory motor), other signal generators, and so forth. The input components of the eyewear device 100 include the touch sensor 113, and various components of the system, including the mobile device 1190 and server system 1198, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

System 1100 may optionally include additional peripheral device elements 1119. Such peripheral device elements 1119 may include biometric sensors, additional sensors, or display elements integrated with eyewear device 100. For example, peripheral device elements 1119 may include any I/O components including output components, motion components, position components, or any other such elements described herein.

For example, the biometric components of the system include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 1125 and 1137 from the mobile device 1190 via the low-power wireless circuitry 1124 or high-speed wireless circuitry 1136.

Eyewear device 100 includes a touch sensor 113, visible light camera 114, image display of the optical assembly 180, sensing circuit 241, image display driver 242, image processor 1112, low-power circuitry 1120, and high-speed circuitry 1130. The components shown in FIG. 11 for the eyewear device 100 are located on one or more circuit boards, for example a PCB or flexible PCB, in the temples. Alternatively or additionally, the depicted components can be located in the chunks, frames, hinges, or bridge of the eyewear device 100. Visible light camera 114 can include digital camera elements such as a complementary metal-oxide-semiconductor (CMOS) image sensor, charge coupled device, a lens, or any other respective visible or light capturing elements that may be used to capture data.

Touch sensor 113 can receive a user input commands (e.g., finger contacts) as input and the sensing circuit 241 along with the depicted gesture application 1144 stored in memory 1134 can track those finger contacts and identify particular input gestures. In one implementation, the identified gesture sends a user input signal from to low power processor 243A. In some examples, the touch sensor 113 is located on different portions of the eyewear device 100, such as on a different temple, chunk, or the frame, but is electrically connected via a circuit board to the visible light camera 114, sensing circuit 241, image processor 1112, image display driver 242, and image display of the optical assembly 180.

In one example, interaction with the touch sensor 113 by the user, e.g., tactile input can be processed by low power processor 243A as a request to capture a single image by the visible light camera 114. The tactile input for a first period of time may be processed by low-power processor 243A as a request to capture video data while the touch sensor 113 is being contacted by a finger, and to cease video capture when no finger contact is detected on the touch sensor 113, with the video captured while the touch sensor 113 was continuously contacted stored as a single video file. In certain embodiments, the low-power processor 243A may have a threshold time period between the inputted touch gesture, such as 500 milliseconds or one second, below which the finger contact with the touch sensor 113 is processed as an image request, and above which the finger contact with the touch sensor 113 is interpreted as a video request. Image processor 1112 includes circuitry to receive signals from the visible light camera 114 and process those signals from the visible light camera 114 into a format suitable for storage in the memory 1134.

Memory 1134 includes various captured images, videos, and a gesture application 1144 to perform the functions of the programming described herein, for example the gesture identification operations outlined in further detail in FIG. 1-10. Although shown as an application, it should be understood that the gesture application 1144 can be part of the operating system stored in the memory 1134 of the eyewear device 100 and provides an application programming interface (API) which is responsive to calls from other applications. Identified gestures can be utilized to allow the user to interact with and manipulate various applications, including the depicted augmented reality application 1145, web browser application 1146, and turn-by-turn navigation application 1147, phone application 1148, photo and video viewer application 1149, music player application 1150, and email application 1151. Through a series of one or more calls to the API of the gesture application 1144, the applications 1145-1151 can manipulate and interact with the displayed content (e.g., graphical user interface) on the optical assembly 180 with image display to control applications 1145-1151. For example, an API call to the gesture application 1144 can return identified finger gestures. In response to the identified finger gestures, the applications 1145-1151 can adjust the image presented on the display based on the identified finger gesture. In some examples, the underlying detected touch events of the identified finger gesture may also be returned by the API call to the gesture application 1144 to the applications 1145-1151. This can allow for custom gestures to be developed and implemented in the applications 1145-1151 for identification (e.g., via a software development kit) and resulting adjustments to images presented on the display based on the identified finger gesture.

As noted above, eyewear device 100 may include cellular wireless network transceivers or other wireless network transceivers (e.g., WiFi or Bluetooth™), and run sophisticated applications. Some of the applications may include web browsers to navigate the Internet, a phone application to place phone calls, video or image codecs to watch videos or interact with pictures, codecs to listen to music, a turn-by-turn navigation application, an augmented or virtual reality application, or an email application. Gestures inputted on the touch sensor 113 can be used to manipulate and interact with the displayed content on the image display of the optical assembly 180 and control the applications.

Following are some examples, of finger gestures which can be identified by the API of the gesture application 1144 and use cases. The API of the gesture application 1144 can be configured to enable gestures to navigate the Internet in the web browser application 1146. The API of the gesture application 1144 can be configured to enable gestures to enter addresses or zoom in and out of maps and locations displayed in the turn-by-turn navigation application 1147. The API of the gesture application 1144 can be configured to enable gestures to select a contact or enter a phone number to place phone calls to in the phone application 1148. The API of the gesture application 1144 can be configured to enable gestures to view photos by swiping or select videos to view in the photo and video viewer application 1149, including pause, stop, play, etc. The API of the gesture application 1144 can be configured to enable gestures to select audio files to be played in the music player application 1150, including pause, stop, play, etc. The API of the gesture application 1144 can be configured to enable gestures to read, send, delete, and compose emails in the email application 1151.

Image processor 1112, touch sensor 113, and sensing circuit 241 are structured within eyewear device 100 such that the components may be powered on and booted under the control of low-power circuitry 1120. Image processor 1112, touch sensor 113, and sensing circuit 241 may additionally be powered down by low-power circuitry 1120. Depending on various power design elements associated with image processor 1112, touch sensor 113, and sensing circuit 241, these components may still consume a small amount of power even when in an off state. This power will, however, be negligible compared to the power used by image processor 1112, touch sensor 113, and sensing circuit 241 when in an on state, and will also have a negligible impact on battery life. As described herein, device elements in an "off" state are still configured within a device such that low-power processor 243A is able to power on and power down the devices. A device that is referred to as "off" or "powered down" during operation of eyewear device 100 does not necessarily consume zero power due to leakage or other aspects of a system design.

In one example embodiment, image processor 1112 comprises a microprocessor integrated circuit (IC) customized for processing sensor data from the touch sensor 113, sensing circuit 241, and visible light camera 114, along with volatile memory used by the microprocessor to operate. In order to reduce the amount of time that image processor 1112 takes when powering on to processing data, a non-volatile read only memory (ROM) may be integrated on the IC with instructions for operating or booting the image processor 1112. This ROM may be minimized to match a minimum size needed to provide basic functionality for gathering sensor data from the touch sensor 113, sensing circuit 241, and visible light camera 114, such that no extra functionality that would cause delays in boot time are present. The ROM may be configured with direct memory access (DMA) to the volatile memory of the microprocessor of image processor 1112. DMA allows memory-to-memory transfer of data from the ROM to system memory of the image processor 1112 independent of operation of a main controller of image processor 1112. Providing DMA to this boot ROM further reduces the amount of time from power on of the image processor 1112 until sensor data from the touch sensor 113, sensing circuit 241, and visible light camera 114 can be processed and stored. In certain embodiments, minimal processing of the camera signal from the touch sensor 113, sensing circuit 241, and visible light camera 114 is performed by the image processor 1112, and additional processing may be performed by applications operating on the mobile device 1190 or server system 1198.

Low-power circuitry 1120 includes low-power processor 243A and low-power wireless circuitry 1124. These elements of low-power circuitry 1120 may be implemented as separate elements or may be implemented on a single IC as part of a system on a single chip. Low-power processor 243A includes logic for managing the other elements of the eyewear device 100. As described above, for example, low power processor 243A may accept user input signals from the touch sensor 113. Low-power processor 243A may also be configured to receive input signals or instruction communications from mobile device 1190 via low-power wireless connection 1125. Additional details related to such instructions are described further below. Low-power wireless circuitry 1124 includes circuit elements for implementing a low-power wireless communication system via a short-range network. Bluetooth™ Smart, also known as Bluetooth™ low energy, is one standard implementation of a low power wireless communication system that may be used to implement low-power wireless circuitry 1124. In other embodiments, other low power communication systems may be used.

High-speed circuitry 1130 includes high-speed processor 243B, memory 1134, and high-speed wireless circuitry 1136. In the example, the sensing circuit 241 and touch sensor 113 are shown as being coupled to the low-power circuitry 1120 and operated by the low-power processor 243B. However, it should be understood that in some examples the touch sensor 113 and sensing circuit 241 can be coupled to the high-speed circuitry 1130 and operated by the high-speed processor 243B. In the example, the image display driver 242 is coupled to the high-speed circuitry 1130 and operated by the high-speed processor 243B in order to drive the image display of the optical assembly 180.

High-speed processor 243B may be any processor capable of managing high-speed communications and operation of any general computing system needed for eyewear device 100. High speed processor 243B includes processing resources needed for managing high-speed data transfers on high-speed wireless connection 1137 to a wireless local area network (WLAN) using high-speed wireless circuitry 1136. In certain embodiments, the high-speed processor 243B executes an operating system such as a LINUX operating system or other such operating system of the eyewear device 100 and the operating system is stored in memory 1134 for execution. In addition to any other responsibilities, the high-speed processor 243B executing a software architecture for the eyewear device 100 is used to manage data transfers with high-speed wireless circuitry 1136. In certain embodiments, high-speed wireless circuitry 1136 is configured to implement Institute of Electrical and Electronic Engineers (IEEE) 802.11 communication standards, also referred to herein as Wi-Fi. In other embodiments, other high-speed communications standards may be implemented by high-speed wireless circuitry 1136.

Memory 1134 includes any storage device capable of storing various applications 1144-1151 and data, including camera data generated by the visible light camera 114 and the image processor 1112, as well as images generated for display by the image display driver 242 on the image display of the optical assembly 180. While memory 1134 is shown as integrated with high-speed circuitry 1130, in other embodiments, memory 1134 may be an independent stand-alone element of the eyewear device 100. In certain such embodiments, electrical routing lines may provide a connection through a chip that includes the high-speed processor 243B from the image processor 1112 or low-power processor 243A to the memory 1134. In other embodiments, the high-speed processor 243B may manage addressing of memory 1134 such that the low-power processor 243A will boot the high-speed processor 243B any time that a read or write operation involving memory 1134 is needed.

Any of the touch sensor or other functions described herein for the eyewear device 100, mobile device 1190, and server system 1198 can be embodied in on one or more methods as method steps or in one more applications as described previously. According to some embodiments, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 1198 or host computer of the service provider into the computer platforms of the eyewear device 100 and mobile device 1190. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device including:
a frame;
an image display;
a processor;
a circuit board;
a touch sensor disposed on the circuit board, the touch sensor including an input surface and a sensor array that is coupled to the input surface to receive at least one finger contact inputted from a user;
a sensing circuit integrated into or connected to the touch sensor and connected to the processor, the sensing circuit configured to measure voltage to track the at least one finger contact on the input surface;
a memory accessible to the processor; and
programming in the memory, wherein execution of the programming by the processor configures the eyewear device to perform functions, including functions to:
receive on the input surface of the touch sensor the at least one finger contact inputted from the user;
track, via the sensing circuit, the at least one finger contact on the input surface;
detect at least one touch event on the input surface of the touch sensor based on the at least one finger contact on the input surface;
identify a finger gesture based on the at least one detected touch event on the input surface; and
adjust an image presented on the image display based on the identified finger gesture.

2. The eyewear device of claim 1, wherein:
the sensor array is a capacitive array or a resistive array;
the sensing circuit is further configured to determine a respective location coordinate and a respective input time of the at least finger contact on the input surface;
the execution of the programming by the processor configures the eyewear device to perform functions, including functions to track, via the sensing circuit, the respective location coordinate and the respective input time of the at least one finger contact on the input surface; and
the function to detect the at least one touch event on the input surface of the touch sensor is based on the at least one respective location coordinate and the respective input time of the at least one finger contact.

3. The eyewear device of claim 2, further comprising:
a chunk integrated into or connected to the frame on a lateral side; and
a temple connected to the lateral side of the frame; wherein:
the frame, the temple, or the chunk includes the circuit board that includes the touch sensor.

4. The eyewear device of claim 3, wherein:
the circuit board is a flexible printed circuit board.

5. The eyewear device of claim 4, wherein:
the capacitive array or the resistive array of the touch sensor includes patterned conductive traces formed of at least one metal, indium tin oxide, or a combination thereof on the flexible printed circuit board.

6. The eyewear device of claim 4, wherein:
the input surface of the touch sensor is surrounded by a protruding ridge to indicate to the user an outside boundary of the input surface of the touch sensor.

7. The eyewear device of claim 4, wherein:
the touch sensor includes the capacitive array;
the capacitive array is formed of patterned conductive sensor electrodes;
the sensor electrodes are connected to the flexible printed circuit board;
the sensor electrodes are disposed below the input surface; and
the sensing circuit is connected to the sensor electrodes via at least one respective electrical interconnect and configured to measure capacitance changes of each of the sensor electrodes of the capacitive array.

8. The eyewear device of claim 7, wherein:
the sensor electrodes are rectangular patterned conductive traces formed of at least one metal, indium tin oxide, or a combination thereof.

9. The eyewear device of claim 4, wherein:
the touch sensor includes the resistive array;
the resistive array includes two conductive layers separated by at least one spacer to form an air gap between the two conductive layers;
the two conductive layers are connected to the flexible printed circuit board;
the two conductive layers are disposed below the input surface; and
the sensing circuit is connected to the flexible printed circuit board and connected to the two conductive layers and configured to measure a voltage drop between the two conductive layers in response to the at least one finger contact.

10. The eyewear device of claim 9, wherein:
one of the two conductive layers includes rectangular patterned conductive traces formed of at least one metal, indium tin oxide, or a combination thereof.

11. The eyewear device of claim 3, wherein:
the touch sensor is on the temple;
a hinge connects the temple to the chunk; and
a substrate forming the temple includes plastic, acetate, metal, or a combination thereof.

12. The eyewear device of claim 2, wherein:
the capacitive array or the resistive array is a grid that forms a two-dimensional rectangular coordinate system to track X and Y axes location coordinates.

13. The eyewear device of claim 12, wherein:
the at least one detected touch event is a single tap on the input surface of the touch sensor;
the identified finger gesture is selection of a graphical user interface element in the image presented on the image display; and
the adjustment to the image presented on the image display based on the identified finger gesture selects the graphical user interface element for display or execution on the image display.

14. The eyewear device of claim 2, wherein:
the capacitive array or the resistive array is linear and forms a one-dimensional linear coordinate system to track an X axis location coordinate.

15. The eyewear device of claim 2, wherein:
the function to receive on the input surface of the touch sensor the at least one finger contact inputted from the user includes functions to:
  receive on the input surface of the touch sensor a first finger contact inputted from the user at a first input time; and
  receive on the input surface of the touch sensor a second finger contact inputted from the user at a second input time which is within a predetermined time period of the first input time;
the function to detect the at least one touch event on the input surface of the touch sensor based on the at least one finger contact inputted from the user includes functions to:
  detect a first touch event on the input surface of the touch sensor based on the first finger contact inputted from the user at the first input time; and
  detect a second touch event on the input surface of the touch sensor based on the second finger contact inputted from the user at the second input time within the predetermined time period of the first input time; and
the function to identify the finger gesture is based on the first and second detected touch events, the first input time, the second input time, and the predetermined time period.

16. The eyewear device of claim 15, wherein:
the first and second detected touch events are a press and hold on the input surface of the touch sensor;
the identified finger gesture is a press and hold of a graphical user interface element in the image presented on the image display; and
the adjustment to the image presented on the image display based on the identified finger gesture is configured to allow a drag and drop of the graphical user interface element on the image display.

17. The eyewear device of claim 15, wherein:
the first and second detected touch events are finger swiping from front to back or back to front on the input surface of the touch sensor;
the identified finger gesture is a scroll of the image presented on the image display; and
the adjustment to the image presented on the image display based on the identified finger gesture scrolls the image presented on the image display.

18. The eyewear device of claim 15, wherein:
the first and second detected touch events are finger pinching on the input surface of the touch sensor;
the identified finger gesture is a zoom in of the image presented on the image display; and
the adjustment to the image presented on the image display based on the identified finger gesture zooms in on the image presented on the image display.

19. The eyewear device of claim 15, wherein:
the first and second detected touch events are finger unpinching on the input surface of the touch sensor;
the identified finger gesture is a zoom out of the image presented on the image display; and
the adjustment to the image presented on the image display based on the identified finger gesture zooms out of the image presented on the image display.

20. The eyewear device of claim 15, wherein:
the first and second detected touch events are finger rotations on the input surface of the touch sensor;
the identified finger gesture is a finger rotation of the image presented on the image display; and
the adjustment to the image presented on the display based on the identified finger gesture rotates the image presented on the image display.

* * * * *